H. W. CORNELL.
Improvement in Corn-Shellers.

No. 128,124. Patented June 18, 1872.

Witnesses:
Henry N. Miller
C. L. Evert

Inventor.
Harmon W. Cornell
per Alexander Mason
Attorneys.

UNITED STATES PATENT OFFICE.

HARMON W. CORNELL, OF OWEGO, NEW YORK.

IMPROVEMENT IN CORN-SHELLERS.

Specification forming part of Letters Patent No. 128,124, dated June 18, 1872.

*To all whom it may concern:*

Be it known that I, HARMON W. CORNELL, of Owego, in the county of Tioga and in the State of New York, have invented certain new and useful Improvements in Corn-Sheller; and do hereby declare that the following is a full, clear, and exact description thereof, reference being had to the accompanying drawing and to the letters of reference marked thereon making a part of this specification.

The nature of my invention consists in the construction and arrangement of a "corn-sheller," as will be hereinafter more fully set forth.

In order to enable others skilled in the art to which my invention appertains to make and use the same, I will now proceed to describe its construction and operation, referring to the annexed drawing, in which—

Figure 1:
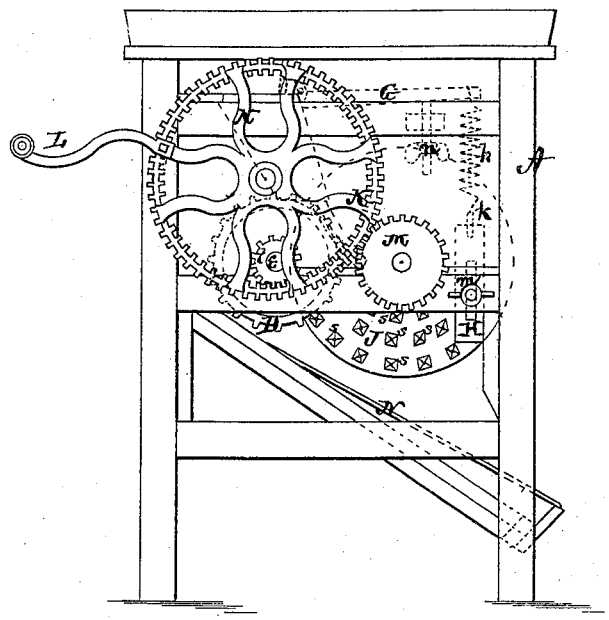
Figure 2:
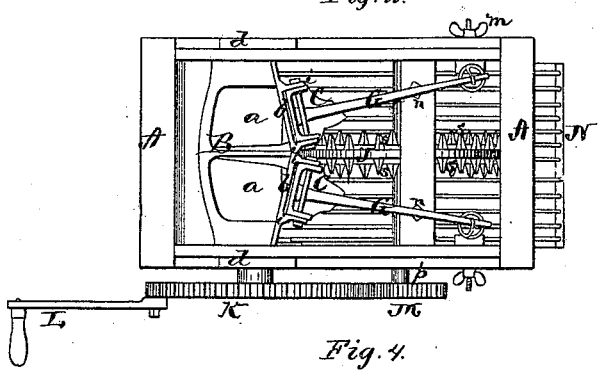
Figure 3:
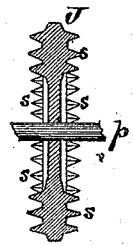
Figure 4:
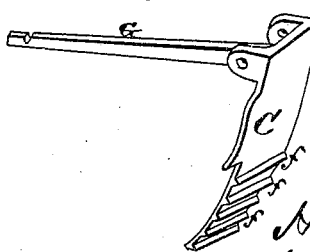

Figure 1 is a side view, and Fig. 2 a plan view, of my machine. Fig. 3 is a vertical section through the shelling-wheel, and Fig. 4 is an enlarged perspective view of one of the jaws which hold the ears of corn to the feed-wheels.

A represents the frame of my machine, at one end of which is situated the double throat B, through which the ears of corn are fed to the machine. The throat B is all cast in one piece, with two feed-passages, $a$ $a$, which are inclined downward, contracting toward their lower ends. The bottoms of said feed-passages are also slightly concave or inclined from the outer edge toward the inner. Across the front part of the throat is a bar, $b$, made angular, as shown, and from said bar, on each side of the center, project two ears, $i$ $i$, between which is pivoted or hinged a jaw, C. On the sides of the throat B are projecting flanges $d$ $d$, which rest upon the edges of the frame A, and are secured to the same by bolts passing through slots in said flanges, whereby the throat is made adjustable, and can be moved backward and forward to suit the feed-wheels below. Under each feed-passage of the double throat B is a feed-wheel, D, made slightly conical-shaped, and with cogs or teeth around the circumference. The two feed-wheels are placed on one shaft, $e$, their smaller ends inward, and are intended to feed the ears of corn downward through the feed-passages and beyond the shelling-wheel. The ears of corn are held against said feed-wheels by the jaws C C. These jaws are constructed as shown in Fig. 4, and pivoted between the ears $i$ $i$ on the bar $b$. It will be seen that, from the inclined position of the bar $b$, the jaws C C hang inclined in a direction opposite to that of the inclination of the feed-wheels; and hence the tendency will be to hold and feed the ears of corn inward toward the center shelling-wheel. On the inner side of each jaw C are inclined teeth $ff$, as shown in Fig. 4, which operate in connection with the teeth or cogs on the feed-wheels. From near the upper end of each jaw C extends an arm, G, which is held down by a coil-spring, $h$, said springs thus operating to hold the jaws against the ears as they pass through. The lower end of each spring is placed on a hook, $k$, attached to a slide, H, which may be raised and lowered at will by means of a set-screw, $m$, to regulate the tension of the spring. Through a cross-bar in the frame A pass (from underneath) set-screws $n$, one under each arm G, for the purpose of adjusting the jaws to the various kinds of corn to be shelled in the machine. The shelling is accomplished by a single wheel, J, placed upon a shaft, $p$. This wheel is constructed as shown in Fig. 3—that is, the sides of the wheel are curved from the periphery inward toward the center for a certain distance, so that the section of the wheel shows a part of a circle on each side, and the metal falls away into the center from this curved surface, thus making the wheel thinner at this point. Upon the curved surfaces are teeth S S, of equal length, set in rows curved to correspond with the curvature of the feed-wheels, the teeth extending in such rows around the entire curved surface on both sides, whereby the cob is carried straight down through the machine without clogging. The convex shelling surface also enables the operator to shell any crooked ears which may be among the corn just as well as the straight ones.

The gearing for operating these various parts is constructed and arranged as follows: Upon a spindle or journal extending from the side of the frame A is mounted a wheel, K. The rim of this wheel is on one side of the arms connecting it with the hub, and provided around both the inner and outer circumference with cogs, as shown in Fig. 1. A crank, L, is also attached to the outer side of this wheel. The inner cogs of the wheel K gear with a pinion, $t$, on the end of the feed-wheel shaft $e$, while the outer cogs gear with a pinion or cog wheel, M, on the shelling-wheel shaft $p$, thus revolving said feed-wheels and shelling-wheel in opposite directions by one driving-wheel. Under the shelling apparatus thus constructed is a sieve, N, arranged, as shown in Fig. 1, to allow the corn to pass through, but not the cobs, which pass off the sieve.

Having thus fully described my invention, what I claim as new, and desire to secure by Letters Patent, is—

1. The shelling-wheel J, having curved shelling-surfaces on both sides extending inward from the periphery toward the center for a certain distance, as shown, and provided with teeth S S, of equal length, set in curved rows around the entire curved surfaces on both sides, substantially as herein set forth.

2. The adjustable double throat B, provided with the feed-passages $a\ a$, angular bar $b$ with ears $i\ i$, and the slotted flanges $d\ d$, substantially as and for the purposes herein set forth.

3. In combination with the jaw C, arm G, and spring $h$, the adjustable slide H, to which the spring is attached for regulating the tension thereof, and the set-screw $n$ for adjusting the jaw, substantially as herein set forth.

4. The combination of the feed-wheels D D, jaws C C, and convex shelling-wheel J, all constructed and arranged as described, and operated by the double cog-wheel K, pinion $t$, and cog-wheel M, substantially as and for the purposes herein set forth.

In testimony that I claim the foregoing I have hereunto set my hand this 22d day of May, 1872.

HARMON W. CORNELL.

Witnesses:
A. N. MARR,
EDM. F. BROWN.